Figure 1:
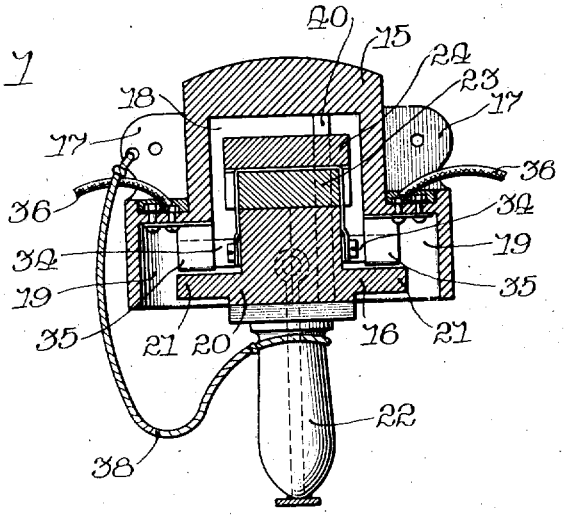

E. O. SCHWEITZER & A. HERZ.

FUSE DEVICE.

APPLICATION FILED AUG. 10, 1917.

Reissued Dec. 25, 1917.

14,416.

2 SHEETS—SHEET 1.

Inventors
Edmund O. Schweitzer
and Alfred Herz
By Brown, Hanson & Boettcher
Attorneys

E. O. SCHWEITZER & A. HERZ.

FUSE DEVICE.

APPLICATION FILED AUG. 10, 1917.

Reissued Dec. 25, 1917.

14,416.

2 SHEETS—SHEET 2.

Inventors
Edmund O. Schweitzer
and Alfred Herz
By Brown, Harrison & Boettcher
Attorneys

UNITED STATES PATENT OFFICE.

EDMUND O. SCHWEITZER AND ALFRED HERZ, OF CHICAGO, ILLINOIS.

FUSE DEVICE.

14,416. Specification of Reissued Letters Patent. Reissued Dec. 25, 1917.

Original No. 1,144,732, dated June 29, 1915, Serial No. 366,219, filed April 3, 1907. Application for reissue filed August 10, 1917. Serial No. 185,612.

*To all whom it may concern:*

Be it known that we, EDMUND O. SCHWEITZER and ALFRED HERZ, citizens of the United States, residing at Chicago, in the county of Cook and State of Illinois, have invented a certain new and useful Improvement in Fuse Devices, of which the following is a full, clear, concise, and exact description, reference being had to the accompanying drawings, forming a part of this specification.

Our invention relates to fuse devices, and its object is to increase the efficiency and general utility of such devices.

More specifically stated, the object of the invention is to prevent arcing upon the operation of the fuse and thereby permit the use of fuses on currents of high potential with perfect safety.

The further object of the invention is to provide simple and practical structures for accomplishing this result.

Other objects of the invention will be referred to hereinafter.

In carrying out the invention as herein set forth, we arrange to project a block or other obstacle into the space occupied by the fuse immediately upon the operation of the same. The obstacle is forced into the fuse space as soon as the fuse starts to soften. In this way such space is filled and the path of any arc which might otherwise prevail, is effectively blocked and the arc thereby prevented, due to the fact that vaporization of the fuse is substantially prevented. As a convenient arrangement for carrying this out, we arrange a fuse between two blocks or members, one of which is subjected to spring tension tending to force it toward and against the other block or member. The fuse, under normal conditions, lies between said two members, but when an overload current passes through it, causing the fuse to blow, the block under spring tension is automatically and immediately forced toward and against the other block, thereby instantaneously filling the space occupied by the fuse and closing the same against the passage of the arc. This general construction of a pair of blocks, one under spring tension, can obviously be embodied in various forms of devices, two of which are illustrated herein. In one of the same the blocks or fuse-holding members are arranged in a casing with suitable contacts, the casing being adapted for mounting in any preferred way. In the other form, the blocks or members are mounted upon a plug member which is adapted for insertion into a socket member which latter is adapted to be mounted in any desired way, and provided with contacts with which connection is to be made. The plug member carrying the fuse blocks or members, can be withdrawn from the socket member to permit repair or replacement of a fuse after being blown, and then reinserted into the socket member, the two members being provided with contact arrangements automatically connecting the fuse in circuit upon the insertion of the plug member.

Certain of the broad features of the invention herein set forth are claimed in an application filed by us August 26, 1909, Serial No. 514,719, which is a division of this application.

Figure 2:
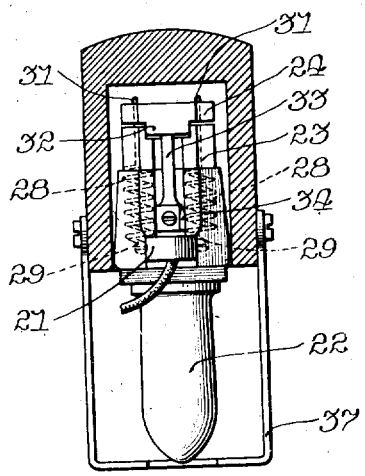
Figure 3:
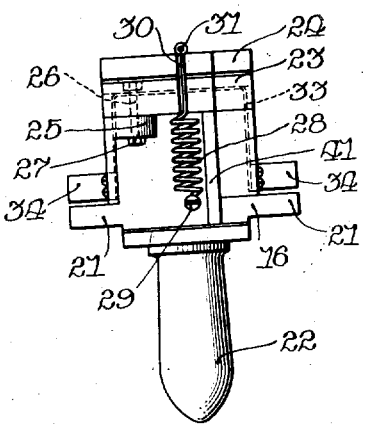
Figure 5:
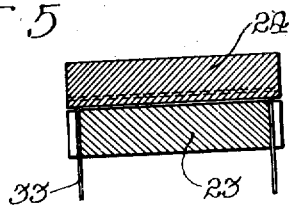
Figure 4:
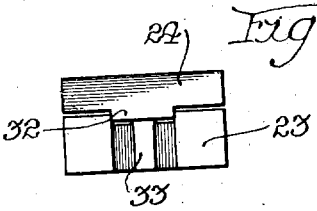
Figure 6:
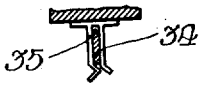

Figures 1 and 2 are cross sections taken on lines at right angles to one another, of a plug and socket fuse device embodying our invention; Fig. 3 is an elevation of the plug member and Fig. 4 is an end view of the same; Fig. 5 is a cross section showing the upper portion of the plug; and Fig. 6 is a view of a detail of construction.

Referring to the figures of the drawings, the device therein shown comprises a socket member 15 and a plug member 16, whereof the member 15 is conveniently in the form of a casing provided with wings or lugs 17, 17, by which it can be mounted or attached in position. The casing of said member 15 provides a chamber 18 having side extensions 19, 19 (Fig. 1). A plug member 16 is adapted to fit into the chamber provided by the casing 15 and is conveniently composed of a body portion 20 having side extensions 21, 21 and provided with a handle 22. Blocks 23, 23 and 24 are mounted upon the body portion 20 of said plug member. The block 23 is secured to lugs 25 by screws 26 passing through said block and said lugs and provided with nuts 27. The block 24 is loose upon the block 23, but is normally held in position by springs 28, 28 secured to the plug member by screws 29 and extended up through grooves 30 (Fig. 3) in the sides of the blocks 23 and 24, the upper ends of said springs being provided with heads 31, 31 to engage the upper surface of the block 24. The block 23 is provided with a groove or channel (Figs. 2 and 4) and the block 24 with a downwardly extending projection 32 adapted to fit in said groove or channel in the block 23. Thus the upper block 24 is held against sidewise movement by the projection 32 and against endwise movement by the upper straight portions of the springs 28, 28 fitting in the grooves 30, 30. A fuse 33 is arranged in the groove in the top of the block 23 and extended down at the ends of said block and connected with contacts 34, 34 secured to the plug member 16. Said contacts 34, 34 are in the form of blades with pointed upper edges as shown in Fig. 6. The socket member 15 is provided with contact members 35, 35 conveniently in the form of separated blades adapted to receive the contact members 34, 34 on the plug member 16. Contacts 36, 36 are connected to the contacts 35, 35 and understood to be part of the circuit to be protected.

The socket member 15 is provided with a yoke 37 which is adapted to swing back and forth underneath and away from the handle 22 on the plug member and thereby hold said member in position when desired, and to permit the removal of the same when desired. A flexible connector such as a cord or wire 38 is connected to one of the wings 17 on the socket member 15 and also to the handle 22 on the plug member 16. This is to prevent the plug member from dropping should it become disengaged from the socket member.

The socket member 15 is provided with inwardly extending ribs or projections 40, and the plug member with outwardly extending projections 41 (Fig. 3) which fit alongside of the ribs 40 and thus form with the latter a partition dividing the chamber of the socket member into two compartments, thereby more effectually preventing the formation of an arc.

In the operation of the device, the fuse is normally in position between the two blocks 23 and 24 as shown in the figures. But when an overload current traverses it and causes it to blow, the upper block 24 is instantaneously and automatically pressed against the block 23, thereby filling the space formerly occupied by the fuse and preventing the formation of an arc.

It will be seen that the device is adapted when the fuse begins to soften to crush out the soft fuse material from the space it formerly occupied, thus displacing the fuse by a barrier to any possible arc that might otherwise be formed.

What we claim is:

1. The combination with a fuse-supporting member having a channel for the fuse, said channel being wider than the fuse, and means for crushing the fuse and flattening it out in said channel when the fuse begins to soften, said crushing means being of the same width as the fuse channel.

2. The combination of a fuse supporting member having a channel for the fuse, said channel being wider than the fuse, a fuse block having a portion adapted to fit and work in said channel, and of the same width as the channel, and spring means acting upon said fuse block and exerting a compressive pressure on the fuse.

3. A device of the class specified comprising a plug and socket member, the socket member being arranged with its closed end uppermost and the plug member being insertible into the socket member from below, a fuse carried by one of said members, means movable upon sufficient softening of the fuse to occupy the fuse space and means for holding the plug member in the socket member.

4. A device of the class specified comprising a plug and socket member, the socket member being arranged with its closed end uppermost and the plug member being insertible into the socket member from below, a fuse carried by one of said members, spring contacts on the plug and socket members adapted to engage one another when the plug member is inserted into the socket member and movable means adapted to occupy the fuse space upon sufficient softening of the said fuse.

5. A device of the class specified, having upper and lower fuse blocks for the fuse, one of which has a fuse channel and the other a strip or portion adapted to fit into said channel, the fuse being in contact with the upper and lower walls of said channel and a spring acting to oppose separation of said upper and lower walls of the fuse channel.

6. A fuse device comprising a plug having a projection, and a fuse carried by said plug and extending over said projection and bent in passing over the same, terminals at the base of said projection to which said fuse is connected, a socket member capable of receiving said plug, and having contacts capable of receiving said terminals on the plug, and a movable member acting against said fuse to form with said projection an impediment to the formation of an arc between said terminals.

7. In a fuse device, the combination of a pair of fuse holding members between which the fuse is placed, one of said members having a groove and the other a projection adapted to fit into said groove, and the fuse being placed into said groove, one of said members being movable toward and away from the other, and side springs engaging the movable member and having a portion of their length arranged in side grooves in said blocks to prevent lateral movement thereof.

8. A fuse device comprising plug and socket members, coöperating contacts on said members, a fuse extending between the contacts on the plug member, a movable block resting upon a portion of the length of said fuse, and spring means holding said block against said fuse and adapted to force the same into the space occupied by the fuse when the latter operates.

9. A fuse device comprising plug and socket members, said members being provided with means forming a partition to divide the chamber of the socket member into two compartments each containing one of the fuse terminals, and a spring-actuated fuse block adapted for projection into the path of the arc upon the blowing of the fuse and thereby completing the partition dividing the fuse chamber into two compartments.

10. A device of the class specified, comprising plug and socket members, one of which is provided with line terminals, and the other of which carries a fuse and damping members arranged on opposite sides of the fuse and in contact therewith, together with spring means for holding said members in position.

11. A fuse device of the class specified having a casing and a fuse carrying device arranged within the casing, said fuse carrying device comprising a pair of compression members between which the fuse is arranged, spring means holding said compression members together, terminals secured to one of said members, the fuse being connected to said terminals and coöperating terminals on the casing whereby said fuse carrying device may be removably mounted in the casing.

12. A device of the class specified having a casing and a fuse carrying device arranged within the casing, said device comprising a pair of compression members between which the fuse is arranged, spring means holding said compression members together and terminals secured to one of said members, the fuse being secured to said terminals and coöperating terminal jaws on the casing whereby said fuse carrying device can be removably mounted in place in the casing.

In witness whereof we hereunto subscribe our names this 7th day of August, A. D. 1917.

EDMUND O. SCHWEITZER.
ALFRED HERZ.